US012750703B1

(12) United States Patent
Durante et al.

(10) Patent No.: US 12,750,703 B1
(45) Date of Patent: Sep. 29, 2026

(54) SYSTEMS AND METHODS FOR TEMPORAL CARRIER OPERATIONS

(71) Applicant: Optimal Dynamics, Inc., New York, NY (US)

(72) Inventors: Joseph Durante, New York, NY (US); Daniel Powell, Jersey City, NJ (US); Burc Arpat, Cupertino, CA (US); Juliana Nascimento, Princeton, NJ (US); Larry Thul, Martinsville, NJ (US); Jaselle Burnham, Atlanta, GA (US); Bryan Moreno-Sanchez, Brooklyn, NY (US); Talal Tahir, North Wales, PA (US); Warren Powell, Princeton, NJ (US)

(73) Assignee: Optimal Dynamics, Inc., New York, NY (US)

( * ) Notice: Subject to any disclaimer, the term of this patent is extended or adjusted under 35 U.S.C. 154(b) by 14 days.

(21) Appl. No.: 19/226,370

(22) Filed: Jun. 3, 2025

Related U.S. Application Data

(60) Provisional application No. 63/655,335, filed on Jun. 3, 2024.

(51) Int. Cl.
*H04W 24/06* (2009.01)
*G06N 20/00* (2019.01)

(52) U.S. Cl.
CPC ............ *H04W 24/06* (2013.01); *G06N 20/00* (2019.01)

(58) Field of Classification Search
CPC ....... H04W 24/06; H04W 48/14; H04W 8/24; G06N 20/00; H04B 17/3912
See application file for complete search history.

(56) References Cited

U.S. PATENT DOCUMENTS

| | | | | |
|---|---|---|---|---|
| 12,430,646 | B2 * | 9/2025 | Seguritan | G06Q 20/4016 |
| 12,523,142 | B2 * | 1/2026 | Lafond | E21B 21/08 |
| 2013/0324076 | A1 * | 12/2013 | Harrang | H04W 28/0812<br>455/405 |
| 2025/0210158 | A1 * | 6/2025 | Awasthi | G06N 20/00 |
| 2025/0307536 | A1 * | 10/2025 | Grelle | G06F 40/20 |
| 2025/0307652 | A1 * | 10/2025 | Xu | G06N 20/00 |
| 2025/0307692 | A1 * | 10/2025 | Kalashnikov | G06N 20/00 |
| 2025/0328704 | A1 * | 10/2025 | Wong | G06F 30/18 |
| 2025/0355785 | A1 * | 11/2025 | Collins | G06F 11/3698 |
| 2025/0374078 | A1 * | 12/2025 | Birr | H04W 24/02 |
| 2026/0052102 | A1 * | 2/2026 | Kumar | H04L 47/125 |
| 2026/0075446 | A1 * | 3/2026 | Huang | H04W 24/08 |
| 2026/0080342 | A1 * | 3/2026 | Morey | G06Q 10/06393 |
| 2026/0087172 | A1 * | 3/2026 | Murugadoss | G06F 21/6254 |

* cited by examiner

*Primary Examiner* — Syed Ali
(74) *Attorney, Agent, or Firm* — DLA PIPER LLP (US)

(57) ABSTRACT

Systems and methods for carrier operations are described. A real-time load model of available loads can be generated. A simulated load representative of a load criteria for a carrier based on the real-time load model can be generated. A real load, based on the simulated load, can be determined. One or more matching real loads can be selected from available real loads based on a comparison to the simulated load.

20 Claims, 17 Drawing Sheets

```
Initialize:
        Database connection
        ForecastingModel
        LoadSources = [SourceA, SourceB, SourceC, ...]
        UpdateBatch = []
        LastBatchUpdateTime = GetCurrentTime()

        BATCH_SIZE_THRESHOLD = y records
        TIME_THRESHOLD = x minutes
Function CrawlAndAggregate():
        currentTimestamp = GetCurrentTime()

        For each source in LoadSources:
        updates = FetchLoadUpdates(source)
        For each loadUpdate in updates:
        parsedLoad = ParseLoad(loadUpdate, currentTimestamp)
        isNew = UpsertLoadInDatabase(parsedLoad)
        UpdateBatch.append({
                "load_data": parsedLoad,
                "is_new": isNew
        })

Function ParseLoad(load, crawlTimestamp):
        Extract fields:
                load_id, origin, destination, pickup_window,
        delivery_window, rate, call_to_pickup_time_diff,
        equipment_requirements, source, booking_date (if
        available)
        Set:
                call_in_date = load.call_in_date if exists, else
        crawlTimestamp, last_seen_date = crawlTimestamp
        Return structuredLoad
```

FIG. 7

```
Function UpsertLoadInDatabase(load):
        If load_id not in DB:
                load.call_in_date = load.last_seen_date
        Insert load into database
                Return True
        Else if load.last_seen_date > DB entry's last_seen_date:
        Update existing load fields and last_seen_date
        Return False
        Else:
                Return False  // Ignore outdated entry

Function UpdateForecastModel(batch):
        formattedInputs = []

        For each entry in batch:
                inputParams = {
                        "features": entry.load_data,
        "is_new": entry.is_new
                }
                formattedInputs.append(inputParams)

        ForecastingModel.batch_update(formattedInputs)    Clear
UpdateBatch
        LastBatchUpdateTime = GetCurrentTime()

Main Loop:
        While True:
                CrawlAndAggregate()
                currentTime = GetCurrentTime()

                if UpdateBatch.size >= BATCH_SIZE_THRESHOLD or
        (currentTime - LastBatchUpdateTime) >= TIME_THRESHOLD:
                UpdateForecastModel(UpdateBatch)
        Sleep(FIXED_INTERVAL)
```

FIG. 7 (continued)

```
Initialize:
        InternalKnownLoads     // Real-time committed and brokerage internal loads
        ExternalKnownLoads     // Real-time visible external loads
        InternalLoadForecaster  // Probabilistic model for future internal loads
        ExternalLoadForecaster  // Probabilistic model for future external loads
        CarrierProfiles        // Objectives & constraints (e.g. home time, margin, etc.)
        Drivers                // Drivers available from this carrier
        FleetOptimizer         // Multi-week driver assignment optimizer
        ScenarioCount = N      // Number of scenarios to sample for robustness
        RecommendationStore = []

Function GenerateRecommendations():
        For scenarioIndex in 1 to ScenarioCount:

        // --- Step 1: Sample Forecasted Loads ---
        forecastedInternalLoads = SampleLoads(InternalLoadForecaster)
        forecastedExternalLoads = SampleLoads(ExternalLoadForecaster)

        // --- Step 2: Combine Known + Forecasted Loads ---
        allInternalLoads = InternalKnownLoads + forecastedInternalLoads
        allExternalLoads = ExternalKnownLoads + forecastedExternalLoads
        allLoads = allInternalLoads + allExternalLoads

        // --- Step 3: Optimize Fleet Network ---
        optimizedNetwork = FleetOptimizer.optimize(
                loads = allLoads,
                drivers = Drivers,
                carrierObjectives = CarrierProfiles,
                horizon = 3 weeks
                )

        // --- Step 4: Bucket External Recommendations ---
        IdentifyAllExternalRecommendations(
                optimizedNetwork,
        allExternalLoads
        )

        // --- Step 5: Aggregate and Rank Buckets ---
        finalRecommendations = AggregateAndRank(RecommendationBuckets)
        Return finalRecommendations

Function SampleLoads(forecaster):
        Return forecaster.sample()
```

FIG. 8

```
Function IdentifyAllExternalAccretiveLoads(network, externalLoads, scenarioIndex):
        tempBucketCounts = {}  // Local per-scenario count

        For load in externalLoads:
                if load is moved in network:
                        key = GenerateBucketKey(load)
                        tempBucketCounts[key] = tempBucketCounts.get(key, 0) + 1

                if key not in RecommendationBuckets:
                        RecommendationBuckets[key] = {
                                "scenario_counts": [],
                                "examples": [],
                                "aggregated_impact": InitImpactMetrics()
                }

                // Optional: store one example load per bucket
                if len(RecommendationBuckets[key]["examples"]) < 3:
                        RecommendationBuckets[key]["examples"].append(load)

                RecommendationBuckets[key]["aggregated_impact"] = MergeMetrics(
                        RecommendationBuckets[key]["aggregated_impact"],
                        EvaluateLoadImpact(load, network)
                )

        // Save count of matches for this scenario
        For key in tempBucketCounts:
        RecommendationBuckets[key]["scenario_counts"].append(tempBucketCounts[key])

Function GenerateBucketKey(load):
        origin3 = Get3DigitZIP(load.origin)
        destination3 = Get3DigitZIP(load.destination)
        timeBucket = GetDate(load.pickup_window)+GetTimeBucket(load.pickup_window)
        otherAttributeBuckets
        for attr in moreAttributesThatMayBeImportant:
                moreAttributesThatMayBeImportant = GetAggAttribute(load.attr)
        Return {"origin":origin3, "destination":destination3, "timeBucket":timeBucket, ...
        "attrName1": otherAttribute1, "attrNameN": otherAttributeN}
```

FIG. 8 (continued)

```
Function GetTimeBucket(pickupWindow):
        hour = ExtractHour(pickupWindow)
        If 5 <= hour < 9: Return "morning"
        If 9 <= hour < 13: Return "midday"
        If 13 <= hour < 19: Return "afternoon"
        Else: Return "night"
Function EvaluateLoadImpact(load, network):
        Return {
                "improved_utilization": Bool or Score,
                "reduced_empty_miles": Value,
                "home_time_alignment": Score,
                "profitability": Estimate
        }
Function InitImpactMetrics():
        Return zeroed impact metrics structure
Function AggregateAndRankWithCDF(buckets, confidenceThreshold, numScenarios):
        rankedList = []
        For key, data in buckets.items():
                scenarioCounts = data["scenario_counts"]
                #because of how we are collecting the data (to leverage sparsity)
                #if no loads withing a bucket show up in a given scenario, but do in others,
                # append a 0 to represent a scenario with no observations
                if len(scenarioCounts)<numScenarios:
                        scenarioCounts.append(0)
                cdf = ComputeCDF(scenarioCounts)
                pmf = ComputePMF(scenarioCounts)
                atLeastProb = ComputeAtLeastProbabilities(pmf)

                maxX = 0
                For x in range(1, max(scenarioCounts) + 1):
                        if atLeastProb[x] > confidenceThreshold:
                                maxX = x
                expectedValue = Sum(scenarioCounts) / len(scenarioCounts)
                impactScore = WeightedImpactScore(data["aggregated_impact"])
                finalScore = CombineScore(impactScore, maxX)
                rankedList.append({
                        "bucket_key": key,
                        "recommended_load_count": maxX,
                        "confidence_threshold": confidenceThreshold,
                        "expected_loads": expectedValue,
                        "score": finalScore,
                        "P(at_least_x)": atLeastProb      })
        Sort rankedList by score descending
        Return top-N rankedList
```

FIG. 8 (continued)

```
Function ComputePMF(counts):
        freq = {}
        total = len(counts)
        For c in counts:
                freq[c] = freq.get(c, 0) + 1
        For k in freq:
                freq[k] = freq[k] / total
        Return freq  // PMF: P(exactly k loads)

Function ComputeAtLeastProbabilities(pmf):
        maxCount = max(pmf.keys())
        result = {}
        For x in range(1, maxCount + 1):
                result[x] = Sum(pmf[k] for k in range(x, maxCount + 1))
        Return result  // P(at least x)
```

Example output for a bucket, representing the procurement opportunity search query for 3 loads with attributes {"origin": "275", "destination": "606", "pickupTime": "20250601morning", "equipment": "REEFER"} where we have added equipment in as an additional important attribute

```
{
        "bucket_key": {"origin": "275", "destination": "606", "pickupTime": "20250601morning",
"equipment": "REEFER"},
        "recommended_load_count": 3,
        "confidence_threshold": 0.85,
        "P(at_least_x)": {
                "1": 0.98,
                "2": 0.90,
                "3": 0.86,
                "4": 0.70
        },
        "example_loads": data["examples"],
"score": 0.92}
```

FIG. 8 (continued)

Optional:

{
"bucket_key": {"origin": "275", "destination": "606", "pickupTime": "20250601morning", "equipment": "REEFER"},
"recommended_load_count": 3,
"confidence_threshold": 0.85,
"P(at_least_x_with_rate_per_mile_greater_than_r)": {
"1": 0.85,
"2": 0.70,
"3": 0.55,
"4": 0.10
},
"example_loads": data["examples"],
"score": 0.92}

FIG. 8 (continued)

```
UserSelectedCriteria:
        - origin_zip_prefix: str  // e.g., "275"
        - destination_zip_prefix: str  // e.g., "606"
        - pickup_time_bucket: str // e.g. 20250601morning
        - min_rate_per_mile: Optional[float]
        - equipment_type: Optional[str]

Additional Filtering:
max_empty_miles
must_return_home_by
sort_by: [score, rate, time]

Function UserSearchExternalLoads(UserSelectedCriteria):
        queryParams = BuildQueryFromUserInput(UserSelectedCriteria)
        candidateLoads = []
        For source, sourceConfidence in ExternalSources:
                realTimeLoads = HitLiveAPI(source, queryParams)
                For load in realTimeLoads:
                        If load.rate_per_mile < UserSelectedCriteria.min_rate_per_mile:
                                continue
                        matchScore = ScoreLoadAgainstUserCriteria(load, UserSelectedCriteria)
                        overallScore = matchScore * sourceConfidence
                        candidateLoads.append({
                                "load": load,
                                "score": overallScore,
                                "source": source.name
                        })
        Return Sort(candidateLoads, key=UserSelectedCriteria.sort_by or "score")

Function BuildQueryFromUserInput(criteria):
        query = {
                "origin_zip_prefix": criteria.origin_zip_prefix,
                "destination_zip_prefix": criteria.destination_zip_prefix,
                "pickup_start": criteria.pickup_time_bucket is translated to a window start,
                "pickup_end": criteria.pickup_time_bucket is translated to a window end
        }
        If criteria.equipment_type:
                query["equipment"] = criteria.equipment_type
        If criteria.min_rate_per_mile:
                query["min_rate_per_mile"] = criteria.min_rate_per_mile
        Return query
```

FIG. 9

```
Function ScoreLoadAgainstUserCriteria(load, criteria):
        originScore = ZipMatchScore(load.origin, criteria.origin_zip_prefix)
        destScore = ZipMatchScore(load.destination, criteria.destination_zip_prefix)
        timeScore = TimeWindowScore(load.pickup_time, criteria.pickup_time_window)
        rateScore = RateScore(load.rate_per_mile) //higher rate recieves higher score
        equipmentScore = 1.0 if load.equipment == criteria.equipment_type else 0.5

        Return WeightedAverage([
                (originScore, 0.2),
                (destScore, 0.2),
                (timeScore, 0.2),
                (rateScore, 0.2),
                (equipmentScore, 0.2)
        ])
```

FIG. 9 (continued)

```
Upon new TMS load tms_load arrival:
requires_manual_attention = []
for search_opportunity in active_procurement_search_opportunities:
        p = match_probability(tms_load, search_opportunity)
        if p >= y:
                possible_match = {"search_opportunity": search_opportunity, "match_probability": p}
        requires_manual_attention.append(possible_match)
show_manual_confirmation_notification = False
if len(requires_manual_attention)>0:
        sort requires_manual_attention by "match_probability" in descending order
        if requires_manual_attention_sorted[0] >= x:
                if (requires_manual_attention_sorted[0] requires_manual_attention_sorted[1])
        /(requires_manual_attention_sorted[0])>z:
        search_opportunity = requires_manual_attention_sorted[0]
                automatically remove a count of 1 from the search_opportunity
                if this reduces the recommendations to 0 remove from the queue
        else:
                show_manual_confirmation_notification = True
if (show_manual_confirmation_notification):
        display notification to the user that a match to an exisiting active_procurement_search_opportunities has been found
        show list of requires_manual_attention
        have user select which one has been fulfilled, or dismiss notification if not applicable
        if user selects a search_opportunity:
                remove a count of 1 from the search_opportunity
                if this reduces the recommendations to 0 remove from the queue
```

Note that setting x > 1 disables the automatic assignment logic.

FIG. 10

```
Upon new TMS load tms_load arrival:
requires_manual_attention = []
for search_opportunity in active_procurement_search_opportunities:
        p = match_probability(tms_load, search_opportunity)
        if p >= y:
                possible_match = {"search_opportunity": search_opportunity, "match_probability": p}
                requires_manual_attention.append(possible_match)
show_manual_confirmation_notification = False
if len(requires_manual_attention)>0:
        sort requires_manual_attention by "match_probability" in descending order
        if requires_manual_attention_sorted[0] >= x:
                if (requires_manual_attention_sorted[0] -
requires_manual_attention_sorted[1])/(requires_manual_attention_sorted[0])>z:
                        search_opportunity = requires_manual_attention_sorted[0]
                        automatically remove a count of 1 from the search_opportunity
                        if this reduces the recommendations to 0 remove from the queue
                        if search_opportunity["possible_drivers"][1] >= p:
                                assign search_opportunity["possible_drivers"][0] to tms_load
                                notify user that an automatic assignment has been made
                        else:
                                display all search_opportunity["possible_drivers"] ids and probabilities of using that driver
                                allow user to select one of these to make the assignment or choose their own driver to assign
                else:
                        show_manual_confirmation_notification = Trueif (show_manual_confirmation_notification):
                        display notification to the user that a match to an exisiting active_procurement_search_opportunities has
                been found
                        show list of requires_manual_attention
                        have user select which one has been fulfilled, or dismiss notification if not applicable
                        if user selects a search_opportunity:
                                remove a count of 1 from the search_opportunity
                                if this reduces the recommendations to 0 remove from the queue
                                display all search_opportunity["possible_drivers"] ids and probabilities of using that driver
                                allow user to select one of these to make the assignment or choose their own driver to assign

Note that setting p > 1 disables the automatic driver assignment logic.
```

FIG. 10 (continued)

SYSTEMS AND METHODS FOR TEMPORAL CARRIER OPERATIONS

CROSS-REFERENCE TO RELATED APPLICATIONS

This application claims the priority benefit of U.S. Provisional Patent Application No. 63/655,355, filed Jun. 3, 2024, the content of which is incorporated herein by reference in its entirety.

TECHNICAL FIELD

The present disclosure relates generally to systems and methods for carrier operations.

BRIEF DESCRIPTION OF THE DRAWINGS

The accompanying drawings, which are incorporated in and form a part of the specification, illustrate example aspects and embodiments of the disclosure, and together with the written description, serve to explain the principles, characteristics, and features of the invention. Various aspects of at least one example are discussed below with reference to the accompanying drawings, which are not intended to be drawn to scale. In the drawings:

FIG. 7 illustrates example pseudocode for an aggregation and load forecasting model in accordance with an embodiment.

FIG. 8 illustrates example pseudocode for real time query recommendations based on contextualized loads in accordance with an embodiment.

FIG. 9 illustrates example pseudocode for real time querying across aggregated sources in accordance with multiple embodiments.

FIG. 10 illustrates example pseudocode for identification of completed procurement and assignment in a carrier system in accordance with an embodiment.

DETAILED DESCRIPTION

Figure 1:
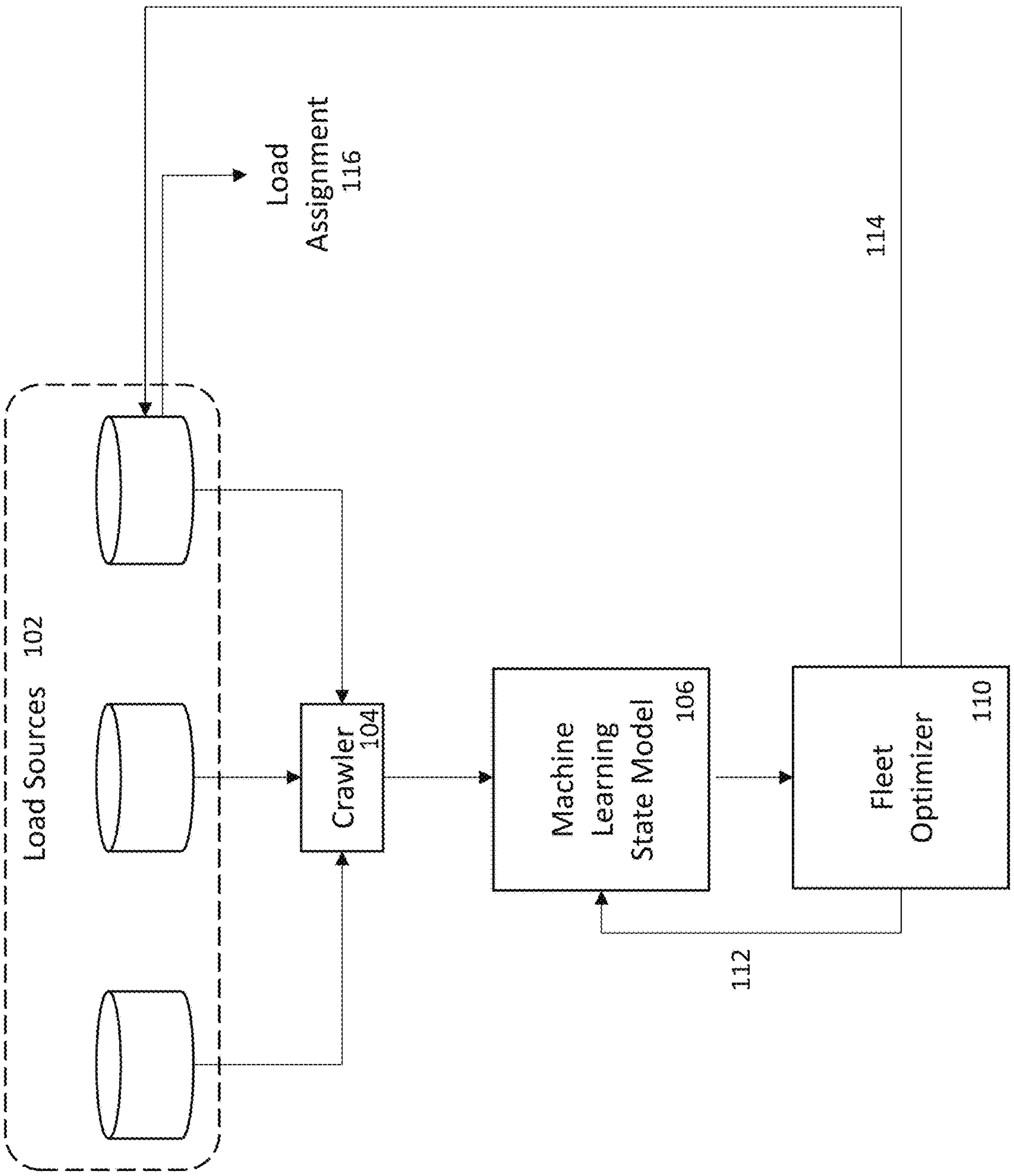
FIG. 1 depicts an illustrative system for optimizing truckload carrier operations in accordance with an embodiment.

This disclosure is not limited to the particular systems, devices and methods described, as these may vary. The terminology used in the description is for the purpose of describing the particular versions, aspects, or embodiments only, and is not intended to limit the scope.

As used in this document, the singular forms "a," "an," and "the" include plural references unless the context clearly dictates otherwise. Those having skill in the art can also translate from the plural form to the singular as is appropriate to the context and/or application. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices also can "consist essentially of" or "consist of" the various components and steps, and such terminology should be interpreted as defining essentially closed-member groups.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C" or "at least one of A, B, and/or C" or "at least one of A, B, or C", is used, in general such a construction is intended in the sense one having skill in the art would understand the convention (for example, "a system having at least one of A, B, and C"; and "a system having at least one of A, B, and/or C"; and "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by 1/10 of the stated values, e.g., ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, e.g., variations in the numerical quantity of such values that can occur, but would be recognized to be equivalents by a person skilled in the art.

The present disclosure relates generally to systems and methods for optimizing sourcing and assignment. For example, optimizing freight load sourcing in the truckload carrier industry. More particularly, the present disclosure relates to techniques that aggregate data from various load sources, generate real-time load models using machine learning, and/or determine optimized load assignments based on specific carrier criteria. The disclosed techniques may be applied to, for example, enhancing asset utilization, improving profitability, and/or increasing driver satisfaction in truckload carrier operations. In the field of logistics and transportation, particularly in the truckload carrier industry, the process of sourcing and assigning freight loads can be a complex task. Freight loads may be available from various sources, including private customer boards, public brokerage boards, and/or emails. These sources can contain a vast amount of data, including information about the load, its origin, destination, and/or other relevant details.

The process of sourcing freight loads can include identifying available loads from the various sources and/or determining which loads are the right fit for a particular carrier. This determination can be based on a variety of factors, such as the carrier's capacity, route preferences, and/or profitability considerations.

Machine learning algorithms have been used in various fields to analyze large amounts of data and/or to generate predictive models. These models can be used to make predictions about future events and/or outcomes based on historical data. In the context of freight load sourcing and/or assignment, machine learning algorithms can be used to analyze data from various load sources and/or generate a real-time model of the available loads. The model can then be used to determine the load criteria for a carrier and/or generate a contextualized load representative of the load criteria for the carrier.

Despite the complexity of the process, the sourcing and/or assignment of freight loads can be an important aspect of the truckload carrier industry. It can directly impact the efficiency of the carrier's operations, the utilization of its assets, and/or its overall profitability. Therefore, systems and methods that can optimize this process are needed.

The present disclosure relates to systems and methods for sourcing and/or assigning freight loads. In some aspects, the disclosed systems and/or methods may aggregate available loads from various sources, generate a real-time model of these loads using machine learning algorithms, and/or determine load criteria for a carrier. The systems and methods may also generate a contextualized load representative of the load criteria for the carrier and/or determine a real load from the aggregated sources based on the contextualized load.

In some cases, the disclosed systems and methods may provide benefits such as improved efficiency in sourcing and/or assigning freight loads, increased profitability for carriers, and/or enhanced utilization of carrier assets. These benefits may be achieved by aggregating load sources, automating driver matching to external freight, and/or optimizing recommendations for probable, profitable external freight that fits specific network requirements.

In some aspects, the disclosed systems and methods may include a data aggregation crawler that aggregates available loads from various sources such as private customer boards, freight brokerages, public load boards, and/or emails. The crawler may continuously monitor these sources for updates to the available loads. The systems and methods may also include a machine learning algorithm that generates a real-time load model of the available loads.

In some cases, the disclosed systems and methods may determine load criteria for a carrier and/or generate a contextualized load representative of the load criteria for the carrier. The systems and methods may also determine a real load from the aggregated sources based on the contextualized load. This determination may involve searching an updated aggregation of the load sources.

In some aspects, the disclosed systems and methods may optimize the contextualized load through a data filter to assess the risk and quality of the load. The risk may include a probability that a real load, similar to the contextualized load, is available in the aggregated sources. The systems and methods may also forecast future available loads based on the real-time model. Forecasting may include determining an expected time of availability for a load within a lane associated with the future available loads.

In some cases, the disclosed systems and methods may include receiving a modification to the load criteria from the carrier. The load criteria may include maintaining a threshold acceptance percentage of the carrier's main shippers.

Referring to FIG. 1, a system for optimizing truckload carrier operations is depicted. The system may include load data sources 102, which may be various sources of available freight loads. In some cases, the load data sources 102 may include private customer boards, freight brokerages, public load boards, emails and/or any other data sources. These sources may provide a diverse and/or comprehensive set of available freight loads for carriers.

The system can include a data aggregation crawler 104. In some aspects, the data aggregation crawler 104 can aggregate the available loads from the load data sources 102 to determine a comprehensive set of available loads. The data aggregation crawler 104 may be configured to continuously monitor the load data sources 102 for updates to the available loads, ensuring that the system has the latest and the fullest set of available loads. By consistently aggregating load data, the system may be further configured to capture additional metrics associated with the available loads. For example, the system may track the length of time a load is available. These metrics may be provided the machine learning algorithms described herein.

The data aggregation crawler 104 may function as an automated software system designed to systematically browse and collect information from various load data sources 102. In some aspects, the data aggregation crawler 104 may utilize web scraping techniques to extract relevant data from private customer boards, freight brokerages, and public load boards. The data aggregation crawler 104 may employ various web scraping techniques to extract data from load sources. In some cases, the crawler may use HTTP requests to retrieve web page content and parse the HTML structure using libraries such as BeautifulSoup or lxml. In some embodiments, the crawler may directly access (e.g., via API, sftp, etc.) private boards, brokerages, and/or load boards to query available freight. Additionally, the crawler may utilize headless browsers or browser automation tools such as Selenium to interact with dynamic web pages and extract data from JavaScript-rendered content.

For email-based sources, the data aggregation crawler 104 may implement email parsing algorithms to identify and extract load information from incoming messages. Email parsing algorithms may utilize natural language processing techniques to identify and extract relevant load information from email content. In some cases, these algorithms may employ pattern matching, keyword recognition, and machine learning models trained on historical email data to accurately parse and categorize load details from various email formats and structures. The data aggregation crawler 104 may be configured to recognize specific data formats and structures across different sources, allowing it to efficiently gather details such as load origin, destination, weight, dimensions, and delivery timeframes.

The aggregated data from the load data sources 102 may be processed by a machine learning state model 106. The machine learning state model 106 may generate a real-time load model of the available loads. This real-time load model may provide a current and/or comprehensive view of the available loads, which may be used to optimize the assignment of loads to carriers.

The machine learning state model 106 may employ various types of machine learning algorithms to generate the real-time load model. In some aspects, supervised learning techniques such as regression models, decision trees, or support vector machines may be used to predict load availability, pricing, or optimal routing based on historical data. These algorithms may be trained on past load data, including features like origin, destination, weight, dimensions, and delivery timeframes, to make accurate predictions about current and future loads.

In some cases, the machine learning state model 106 may utilize unsupervised learning methods, such as clustering algorithms or dimensionality reduction techniques, to identify patterns and relationships within the aggregated load data. These approaches may help categorize loads into similar groups, detect anomalies, or uncover hidden trends that can inform load assignment decisions. Additionally, reinforcement learning algorithms may be applied to optimize load assignment strategies over time, learning from the outcomes of previous assignments to improve future decision-making.

The machine learning state model 106 may also incorporate deep learning techniques, such as recurrent neural networks (RNNs) or long short-term memory (LSTM) networks, to capture temporal dependencies and patterns in the load data. These models may aid in forecasting future load availability or predicting seasonal trends in freight demand. In some implementations, ensemble methods combining multiple machine learning algorithms may be used to improve the overall accuracy and robustness of the real-time load model.

The machine learning state model 106 may operate within a multidimensional model space that encompasses various features and parameters relevant to freight load sourcing and assignment. This model space may include dimensions representing load characteristics such as origin, destination, weight, dimensions, delivery timeframes, and pricing, as well as carrier-specific factors like capacity, route preferences, and historical performance. The model may use spatial and/or temporal aggregation with a weighting scheme configured to balance inference in spatial-temporal domains with differing levels of sparsity, variability, and/or bias. In some aspects, the model space may also incorporate temporal dimensions to capture seasonal trends, market fluctuations, and evolving patterns in freight demand and supply.

The complexity of the model space may be further enhanced by incorporating external factors that influence the freight industry, such as weather conditions, fuel prices, regulatory changes, and economic indicators. In some cases, the machine learning state model 106 may dynamically adjust the dimensionality and structure of the model space based on the importance and relevance of different features, as determined through techniques like feature selection and dimensionality reduction. This adaptive approach may allow the model to maintain a balance between comprehensiveness and computational efficiency, ensuring that it can process and analyze large volumes of data in real-time while providing accurate and actionable insights for load sourcing and assignment optimization.

The system may include a fleet optimizer 110. The fleet optimizer 110 may determine contextualized representative load assignments based on the real-time load model generated by the machine learning state model 106. The contextualized representative load may represent a forecasted need for loads in one or more lanes. The forecasted need may be determined based on one or more reasons including, but not limited to, driver utilization, drivers getting home, and service for loads farther away. The fleet optimizer 110 may sample available and/or predicted loads in the one or more lanes, from the machine learning state model 106, and select a contextualized representative load, or a real load, based on load criteria.

In some cases, the fleet optimizer 110 can perform a request 112 for load assignment 116 from the originating load data sources 102. The request 112 may be based on the contextualized representative load assignments determined by the fleet optimizer 110.

In some cases, the system may refine the process of generating contextualized loads by incorporating risk assessment. In some aspects, the contextualized loads can be filtered based on risk, which may include factors such as the likelihood of real load availability, likelihood of load cancellation, and/or historical performance data of the freight lanes. The risk assessment may be conducted using a data filter that evaluates the probability of each contextualized load being a viable and/or profitable option for the carrier. The data filter may utilize historical data, real-time market trends, and/or predictive analytics to assess the risk associated with each load.

In some aspects, the data filter may be implemented as a multi-layered architecture configured to process and evaluate contextualized loads based on various risk factors. The data filter may incorporate a feature selection module that identifies the most relevant factors for risk assessment. This module may utilize techniques such as principal component analysis, mutual information, or recursive feature elimination to determine which attributes have the strongest correlation with load viability and profitability.

In some embodiments, the data filter may determine a probability of a contextualized load being available and/or procurable at any given time at the price considered in the optimization step. The fleet optimizer 110 may consider a contextualized load in lanes where the probability a load is available with a price is great enough. The price may be chosen such that it is a lower end percentile of the price distribution for a given lane. The balance between the load arrival process and load-decay process in a lane may affect the probability a sufficient load will be available. For example, if the lane has a process where a bunch of loads appear all in the morning at 8 am, and they are all acquired by 8:15, this may be a riskier recommendation than a lane where they tend stay available until noon.

In some cases, the core of the data filter may consist of multiple risk evaluation models working in parallel. These models may include statistical methods, machine learning algorithms, and rule-based systems. For example, the filter may employ logistic regression to estimate the probability of load cancellation, decision trees to assess the likelihood of on-time delivery, and neural networks to predict potential profitability.

The data filter may also include a temporal analysis component that considers historical trends and seasonal patterns. This component may use time series analysis techniques to identify cyclical fluctuations in load availability and pricing, which may inform the risk assessment process.

In some implementations, the data filter may feature an adaptive learning mechanism that continuously updates its risk assessment models based on new data and outcomes. This mechanism may allow the filter to improve its accuracy over time and adapt to changing market conditions.

The output layer of the data filter may aggregate and synthesize the results from various risk evaluation models. This layer may produce a composite risk score for each contextualized load, potentially using weighted averaging or more sophisticated ensemble methods. The risk scores may be accompanied by confidence intervals or probability distributions to provide a more nuanced view of the potential outcomes.

In some aspects, the data filter may include an explainability module that generates human-readable justifications for its risk assessments. This module may use techniques such as SHAP (SHapley Additive exPlanations) values or LIME (Local Interpretable Model-agnostic Explanations) to provide insights into which factors most significantly influenced each risk evaluation.

The data filter may also incorporate a feedback loop that captures the actual outcomes of assigned loads and compares them to the predicted risks. This information may be used to calibrate the filter's models and improve future risk assessments. In some cases, this feedback mechanism may include both automated data collection and manual input from dispatchers or other stakeholders.

In some cases, the optimization of contextualized loads may involve prioritizing loads from shippers with whom the carrier has established strong relationships. The optimization algorithm may be configured to maintain and/or improve a threshold acceptance percentage of loads from these shippers, thereby helping to ensure that the carrier continues to foster and/or benefit from these valuable business relationships. By doing so, the system may help the carrier to secure a consistent volume of loads from trusted partners, which can lead to more stable and predictable operations. In some embodiments, the optimization algorithm directly incorporates external market recommendations used for planning and dispatching a trucking network.

The optimization algorithm may employ techniques such as linear programming, genetic algorithms, mixed integer programming network flow algorithms, or particle swarm optimization to find optimal load assignments that maximize carrier profitability while satisfying operational constraints. In some cases, the algorithm may utilize a multi-objective optimization approach to balance competing goals such as revenue maximization, cost minimization, and driver satisfaction. The algorithm may also incorporate heuristic methods or metaheuristics to efficiently explore the solution space and handle the complexity of real-world logistics scenarios.

The optimization algorithm may employ machine learning, reinforcement learning, or stochastic optimization techniques to improve the quality of its recommendations, and thus the contextualized load recommendations. These techniques may include, but are not limited to: value function approximations, spatial and/or temporal hierarchical modeling techniques, scenario analysis, incorporation of samples from probabilistic load forecasting models, direct lookaheads, stochastic lookaheads, or policy function approximations, or any combinations thereof.

Furthermore, the optimization process may consider the carrier's network balance and/or asset utilization, aiming to assign loads in a manner that maximizes the efficiency of the carrier's operations. This may include optimizing for backhaul opportunities, minimizing empty miles, and/or aligning load assignments with driver availability and preferences. The optimization algorithm may work in conjunction with the machine learning state model to dynamically adjust the contextualized loads in response to changes in the carrier's operational requirements and/or the availability of loads.

In some aspects, the system may facilitate the sourcing and assignment of freight loads in a manner that maximizes profit and/or asset utilization for carriers. By aggregating all available load sources, proactively recommending the ideal spot loads, and/or automating driver matching to external freight, the system may streamline workflows and increase profit for carriers.

Figure 2:
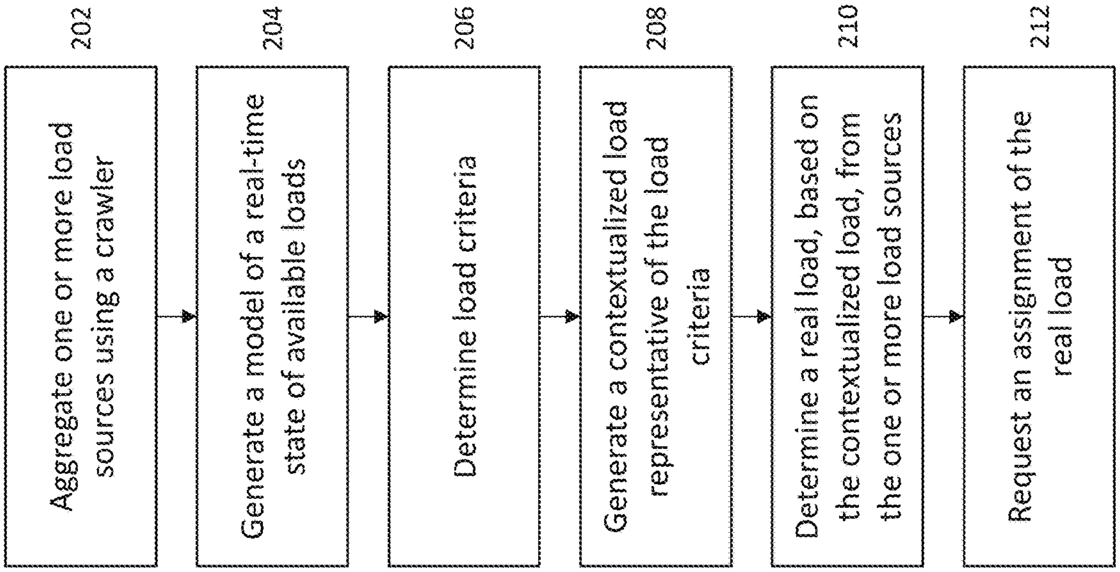
FIG. 2 illustrates an illustrative process for sourcing and assigning freight loads in accordance with an embodiment.

Referring now to FIG. 2, a flowchart of a process for sourcing and assigning freight loads is depicted. The process begins with the load source aggregation step 202, which may include aggregating one or more load sources using a data aggregation crawler (e.g., the data aggregation crawler 104). In some cases, the load sources may include private customer boards, freight brokerages, public load boards, and/or emails, among others.

The process may include real-time load model generation 204. The model generation may be performed using a machine learning algorithm (e.g., the machine learning state model 106). The real-time load model may provide a current and/or comprehensive model of the available loads, which may be used to optimize the assignment of loads to carriers.

The process may include determination of load criteria 206. The load criteria may include various factors that are relevant to the carrier, such as the carrier's capacity, availability, and/or preferences, among others. In some aspects, the load criteria may be generated based on historical information. Alliteratively, or additionally, the load criteria may be determined based on input from the carrier, such as through a user interface or an API.

In some cases, the determination of load criteria 206 may include maintaining a threshold acceptance percentage of the carrier's main shippers. The main shippers may be those shippers that contribute a substantial portion of the carrier's business. The threshold acceptance percentage may be a predetermined value or may be dynamically determined based on various factors such as the carrier's capacity, the carrier's operational efficiency, and/or the carrier's customer service goals, among others. Alternatively, the main shippers may be provided by the carrier.

The process may include the generation of a contextualized load 208. The contextualized load may be generated based on the real-time model of the available loads. In some cases, the contextualized load may be optimized through a data filter to assess the risk and/or quality of the load. The risk may include a probability that the real load is, or will be, available in the aggregated sources.

In some aspects, the generation of contextualized loads 208 may include generating a set of contextualized loads through an optimization algorithm. This optimization algorithm may be designed to improve asset network profitability by a threshold percentage. The threshold percentage may be a predetermined value and/or may be dynamically determined based on various factors such as the current market conditions, the carrier's operational costs, and/or the carrier's profit margin goals, among others.

The contextualized load can represent a tailored selection of freight opportunities that align with the specific criteria and preferences of a carrier. This may include factors such as preferred geographic regions, load types, weight limits, and/or delivery schedules. The contextualized load can be derived from the real-time load model and/or configured to be a close match to the carrier's operational capabilities and strategic goals. By generating a contextualized load, the system can provide carriers with load options that are not just available but are also the right fit for their business model, thereby increasing the likelihood of successful and/or profitable load assignments. The generation of a contextualized load may involve the application of advanced analytics and optimization techniques to ensure that the load recommendations are relevant and/or actionable for the carrier. This process may take into account real-time changes in the freight market, the carrier's current asset deployment, and/or historical performance data to create a dynamic and responsive load sourcing solution.

Providing recommendations based on contextualized loads can benefit carriers by generalizing the recommendation. Recommendations based on real loads can quickly expire as real loads are assigned. By generalizing around contextualized loads, carriers can reliably optimize load assignments while accommodating change in available loads.

The process may include the determination of a corresponding real load 210. A real load, based on the contextualized load, may be determined from the one or more load sources. This determination may involve searching an updated aggregation of the load sources. This updated aggregation may be generated by the data aggregation crawler 104, which may continuously monitor the load data sources 102 for updates to the available loads. A real load may then be determined based on the contextualized load. The real load may be a specific load that matches the contextualized load and is available for assignment to the carrier.

In some aspects, multiple real loads may match the contextualized loads. The system may be configured to gather (e.g., using the data aggregation crawler 104) the resulting real loads. The real loads may be processed for feasibility in the network according to the plan generated with the contextualized load. Additionally, or alternatively, the real loads may be scored or ranked based on how closely they match the contextualized load recommendation, how profitable they are, and/or how much they fit the objectives of the carrier, such as empty mile reduction, driver utilization and satisfaction.

The process may include requesting an assignment of the real load 212. The request may be made to the originating load source, such as through a user interface or an API. In some cases, including message-based load sources (e.g., load sources utilizing emails or posts), a message requesting the real load may be automatically generated and/or sent to the load source. For example, the system may automatically draft and/or send an email. In some cases, the message may be generated using an artificial intelligence model (e.g., a large language model). In other cases, the message may be generated using templates and/or predetermined information associated with the real load and/or the carrier. Templates may be associated with a load source.

In some aspects, the load assignment request 212 may be performed automatically by the system, or it may be performed manually by the carrier. In cases where the load assignment request 212 is performed automatically, the system may use the determined real load to automatically request the assignment of the load to the carrier. Alternatively, the carrier may manually confirm selection of a real load, and/or the system may automatically request the load from load source. In cases where the load assignment request 212 is performed manually, the carrier may manually select the real load from the real loads search results 408 and/or request the assignment of the selected load.

In some embodiments, the load assignment request 212 may be performed in real-time, allowing the carrier to quickly and efficiently assign the real load. This real-time operation may be particularly beneficial in scenarios where the availability of the real load is time-sensitive, as it can allow the carrier to quickly secure the assignment of the load before it is no longer available.

In some cases, the load assignment request 212 may include additional features or functionalities to facilitate the assignment of the real load. For example, the load assignment request 212 may include features for tracking the status of the load assignment request, providing notifications and/or alerts related to the load assignment, and/or managing the logistics of the load assignment, among others. These additional features and/or functionalities may enhance the efficiency and/or effectiveness of the load assignment process, thereby further improving the profitability and/or asset utilization of the carrier.

In some aspects, the disclosed systems and methods may further comprise forecasting future available loads based on the real-time model. The forecasting may be performed by the machine learning state model 106, which may use historical load data and current market trends to predict future available loads. The forecasting may provide valuable insights into the future state of the freight market, which may be used to optimize the assignment of loads to carriers. For example, the risk associated with a contextualized load may be modified based on a forecasted future state of the model.

In some cases, the forecasting may further include determining an expected time of availability for a load within a lane associated with the future available loads. The expected time of availability may be a predicted time at which a load is expected to become available for assignment. This prediction may be based on various factors such as historical load availability data, current market trends, and/or the shipper's operational schedule, among others. The expected time of availability may be used to optimize the scheduling of load assignments, and can thereby improve the efficiency of the carrier's operations.

In some aspects, load selection can include a bidding and dynamic load acceptance stage, which can be incorporated into the disclosed system to improve financial performance.

In the bidding stage, carriers can negotiate contracts with shippers, providing quotes on capacity and/or pricing based on anticipated freight volumes. This stage requires a deep understanding of the profitability of each load within the network context. The system can digitize and/or standardize the Request for Proposal (RFP) response process, using AI-powered simulations to estimate the number of loads a carrier can move in a lane on a day-to-day basis. This simulation can consider the interactions between different lanes and/or the flow of other loads, and can provide a realistic estimate of daily load movement capacity.

The dynamic load acceptance stage can include making real-time decisions on load planning, which can be a complex task due to the variability of loads tendered and/or the incomplete information about the network at the time of decision-making. The system can utilize AI to blend forecasting information with known information to make robust decisions. This can include performing multiple simulations per load to capture uncertainties, driver acceptance decisions, and/or potential delays. Machine learning can be used to create distributional forecasts, testing a range of outcomes to determine the attractiveness of loads and/or the carrier's ability to meet bid commitments.

The system may be enhanced by integrating a bid response optimizer that uses AI to simulate real-world dispatching and/or generate Lane Scores. The scores can rate lanes based on metrics like load coverage and/or service, guiding carriers in making informed decisions on which lanes to accept and/or the volume to commit to. The system can include a dynamic load acceptance optimizer that uses high-dimensional AI and/or machine learning to forecast load profitability and/or make load acceptance decisions that consider the partial information available about the network.

By integrating these concepts, the system can provide carriers with intelligent, repeatable methodologies for identifying the freight that fits their network the best. This can enable carriers to optimize load selections from bid response to daily load acceptance, streamlining decision-making processes, and/or maximizing profits. The system can thus not just focus on optimizing driver-to-load assignments but also on optimizing procurement and load allocation, which can be pivotal for achieving substantial gains in profitability.

Figure 3:
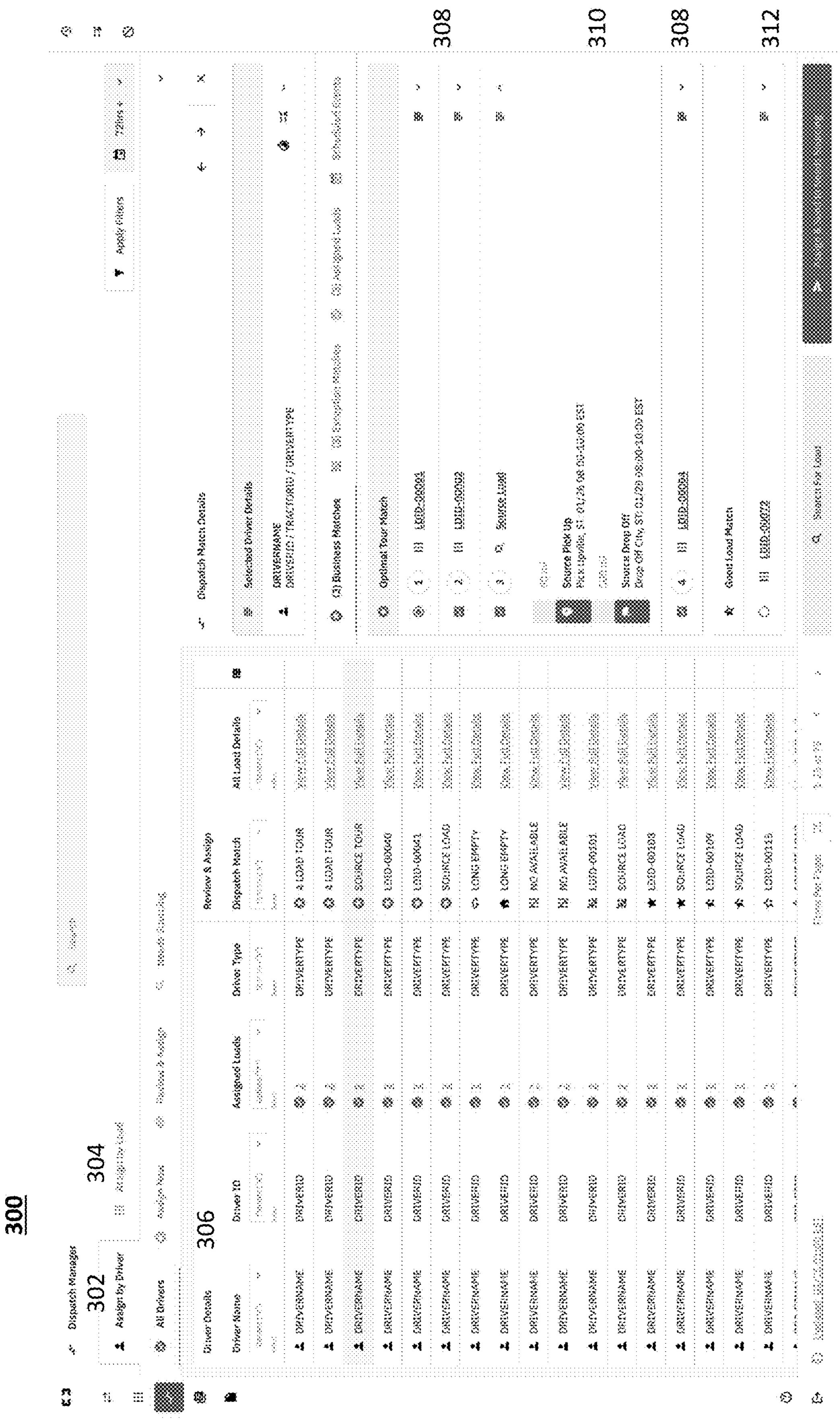
FIG. 3 presents an illustrative dispatch management user interface for load assignments in accordance with an embodiment.

Referring now to FIG. 3, a dispatch management user interface 300 is depicted. The dispatch management user interface 300 may provide options to assign by driver 302 and assign by load 304. These functionalities may allow a user, such as a dispatcher and/or a fleet manager, to assign freight loads to drivers and/or to assign drivers to freight loads, respectively. In some cases, the assignment by driver 302 may include selecting a driver and/or then assigning one or more freight loads to the selected driver. Conversely, the assignment by load 304 may include selecting a freight load and/or then assigning one or more drivers to the selected load.

The dispatch management user interface 300 may include a driver details section 306. The driver details section 306 may provide specific information about the drivers, such as their availability, location, capacity, and/or preferences, etc. This information may be used to make informed assignment decisions. For example, a dispatcher may use the driver details 306 to determine which drivers are available to take on a new freight load, and/or which drivers are located near the pickup location of a freight load. The information may be provided to the machine learning state model 106.

The dispatch management user interface 300 may display real-time matches for freight loads and/or drivers. These matches may be categorized into real load matches 308 contextualized-optimal matches 310, and/or alternative tour matches 312. The contextualized-optimal matches 310 may represent the ideal matches between freight loads and/or drivers, based on a contextualized view of the freight market and/or the carrier's operational parameters. The alternative tour matches 312 may represent best fit and/or good (e.g., not necessarily ideal) matches between freight loads and/or drivers. In this example, the contextualized-optimal matches 310 are configured to complete a tour including real load matches 308. The real load matches 308 may be existing scheduled real loads already present in the carrier's system or optimal results generated by the system. The alternative tour matches 312 may provide an alternative tour option to the first real/contextualized option 308/310. The alternative tour matches 312 may include real loads and/or contextualized loads (e.g., similar to real load 308 and contextualized load 310).

The elements of the dispatch management user interface 300 can be interconnected with the driver details 306 informing the assignment options 302 and 304, and/or the match categories 310, and/or 312 providing actionable choices for load assignments. For example, a dispatcher may use the driver details 306 to determine which drivers are available and/or suitable for a particular freight load, and/or then use the assignment options 302 and/or 304 to assign the freight load to one of the suitable drivers. The dispatcher may also use the match categories 308, 310, and/or 312 to identify potential matches between freight loads and/or drivers, and then use the assignment options 302 and/or 304 to assign the identified matches.

In some aspects, the system may continuously aggregate available real loads from the various load sources through the data aggregation crawler, which may monitor and/or collect load information in real-time from private customer boards, freight brokerages, public load boards, and/or email communications. The aggregated real loads may be processed through a matching algorithm that may compare the characteristics of each real load against the parameters of the contextualized loads. This matching process may evaluate factors such as origin and/or destination locations, pickup and/or delivery timeframes, load weight and/or dimensions, equipment requirements, and/or pricing parameters. The system may maintain a dynamic database of available real loads that is continuously updated as new loads become available and/or existing loads are assigned or expire, helping to ensure that the matching process operates on the most current information available.

In some embodiments, the system may implement adaptive matching thresholds through the data filter to accommodate time-sensitive scenarios where contextualized loads approach their required fulfillment timeframes. As the time for a contextualized load assignment nears, the data filter may progressively loosen the matching criteria to expand the pool of potentially suitable real loads. For example, the system may initially require exact matches for pickup and/or delivery locations but may gradually expand the acceptable geographic radius as time progresses. Similarly, the system may relax constraints on delivery timeframes, equipment specifications, and/or pricing parameters to identify satisfactory matches that still meet the carrier's operational requirements. This adaptive approach may help ensure that contextualized loads can be fulfilled even when perfect matches are not immediately available, while maintaining the system's ability to identify optimal assignments when sufficient time and/or options are available. In some embodiments, the system may automatically assign real loads which meet a matching threshold.

Figure 4:
FIG. 4 shows an illustrative internal load search user interface for managing freight loads in accordance with an embodiment.

Referring now to FIG. 4, an internal load search user interface 400 is depicted. The internal load search user interface 400 may provide a platform for users to view and/or manage different types of freight loads. In some aspects, the internal load search user interface 400 may display sections for real internal loads 402 and/or real external loads 404. These sections may allow users to view and/or manage different types of freight loads, providing a comprehensive view of internal 402 and/or external 404 load options.

The internal load search user interface 400 may include load search criteria 406. The load search criteria 406 may be provided to filter and/or refine the search results according to specific requirements. These requirements may be determined based on various factors such as the carrier's capacity, availability, and/or preferences, among others.

In some cases, the load search criteria 406 may be determined based on input from the carrier, such as through a user interface or an API. The load search criteria 406 may be automatically generated by selecting a contextualized recommendation (e.g., contextualized-optimal tour match 310).

The internal load search user interface 400 may also present real loads search results 408. The real loads search results 408 may be presented in a tabulated format, showing the outcome of the search based on the applied criteria 406. The real loads search results 408 may include details such as load ID, shipper name, pickup location, and/or assignment details. These details may provide valuable information for the carrier, facilitating the selection and/or assignment of freight loads.

In some aspects, the real loads search results 408 may be ranked for all searches according to quality of fit to the search criteria and/or other criteria such as revenue and network health goals. The real loads search results 408 may be checked for feasibility in the dispatch plan if the search is performed based on a contextual load recommendation (e.g., by selecting a contextualized-optimal tour match 310).

In some aspects, the internal load search user interface 400 may facilitate the selection and/or assignment of freight loads by providing a comprehensive view of available load options in conjunction with the search criteria 406 and results 408. This comprehensive view may allow the carrier to quickly and/or efficiently source and assign freight loads, thereby improving the efficiency of the carrier's operations and/or maximizing the carrier's profit and asset utilization.

Figure 5:
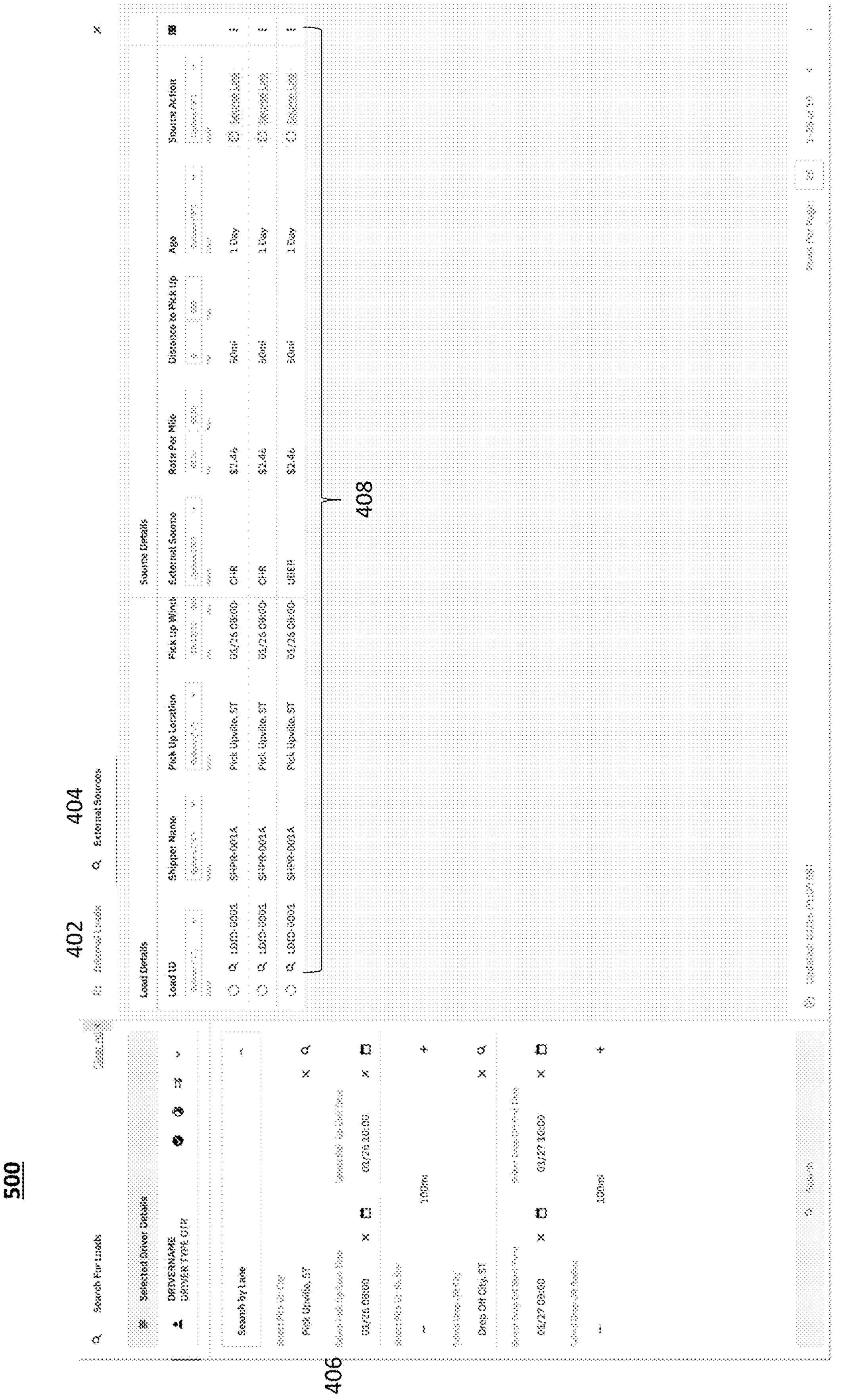
FIG. 5 depicts an illustrative external load search user interface for managing and differentiating freight loads in accordance with an embodiment.

Referring now to FIG. 5, an external load search user interface 500 is depicted. The external load search user interface 500 may include sections for real internal loads 402 and real external loads 404. These sections may allow users to manage and/or differentiate between these two types of freight loads. In some cases, the external load search user interface 500 may provide a comprehensive view of both internal 402 and/or external 404 load options, thereby enabling users to effectively manage a diverse set of freight loads.

The external load search user interface 500 may also provide load search criteria 406. The load search criteria 406 may enable users to filter and/or refine the search for loads according to specific requirements. These requirements may be determined based on various factors, such as the carrier's capacity, availability, and/or preferences, among others. In some aspects, the load search criteria 406 may be determined based on input from the carrier, such as through a user interface or an API.

The external load search user interface 500 may also display real loads search results 408. The real loads search results 408 may present the outcome of the search, providing detailed information such as load ID, shipper name, pickup location, and/or assignment details in a tabulated format. This detailed information may facilitate the selection and/or assignment of freight loads by providing valuable insights into the available load options.

In some cases, the external load search user interface 500 may facilitate the selection and/or assignment of freight loads by providing a comprehensive view of available load options in conjunction with the search criteria 406 and/or the search results 408. This comprehensive view may allow the carrier to quickly and/or efficiently source and assign freight loads, thereby improving the efficiency of the carrier's operations and/or maximizing the carrier's profit and asset utilization.

EXAMPLE EMBODIMENTS

In some embodiment, a method for optimizing carrier operations may include: aggregating, by an agent, or crawler, executing on one or more processors, one or more load sources using application programming interfaces and web scraping to determine available loads; generating, using a deep learning model on the one or more processors, a real-time load model of the available loads in a n-dimensional model space that incorporates spatial and temporal dimensions; determining, by the one or more processors, load criteria for a carrier; generating, by the one or more processors, a simulated, or contextualized, load representative of the load criteria for the carrier based on the real-time model; and determining, by the one or more processors, a real load, based on the simulated load, from the one or more load sources by selecting, from an updated aggregation of the load sources, one or more matching real loads based on a comparison to the simulated load.

In some embodiments, the one or more load sources may comprise private customer boards, freight brokerages, public load boards, and emails.

In some embodiments, the agent may be configured to continuously monitor the one or more load sources for updates to the available loads.

In some embodiments, the method may include optimizing the simulated load through a data filter to assess risk and/or quality of the load.

In some embodiments, the risk may comprise a probability that the real load is available in the one or more load sources.

In some embodiments, determining the real load may comprise searching an updated aggregation of the one or more load sources.

In some embodiments, generating the simulated load may comprise generating a set of simulated loads through an optimization algorithm configured to perform at least one of improving asset network profitability by a threshold percentage and maintaining a threshold acceptance percentage of key shippers for the carrier.

In some embodiment, the method may include forecasting future available loads based on the real-time model.

In some embodiments, forecasting may include determining an expected time of availability for a load within a lane associated with the future available loads.

In some embodiments, the method may include receiving a modification to the load criteria from the carrier.

In some embodiments, the method may include requesting an assignment of the real load to the carrier.

In some embodiments, determining the real load based on the simulated load from the updated aggregation of the load sources may include continuously updating aggregation of the load sources and/or detecting the one or more matching real loads based on the comparison to the simulated load.

Example Data Processing System

Figure 6:
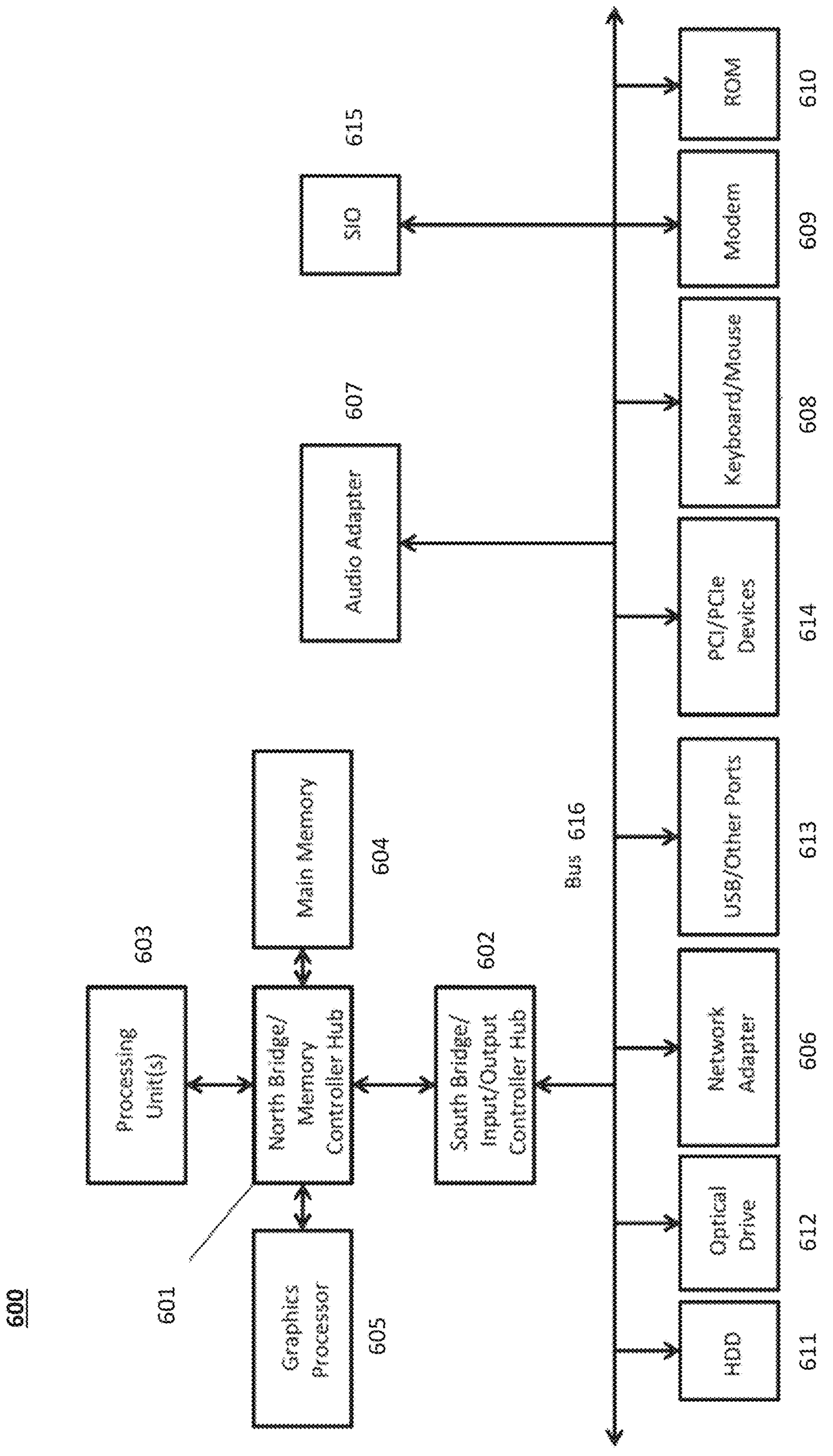
FIG. 6 illustrates a block diagram of an illustrative data processing system in which embodiments are implemented.

FIG. 6 illustrates a block diagram of an example data processing system 600 in which embodiments are implemented. The data processing system 600 is an example of a computer, such as a server or client, in which computer usable code or instructions implementing the process for illustrative embodiments of the present invention are located. In some embodiments, the data processing system 600 may be a server computing device. The data processing system 600 may be configured to, for example, perform processing associated with the machine learning state model 106 and/or fleet optimizer 110.

In the depicted example, the data processing system 600 may employ a hub architecture including a north bridge and/or memory controller hub (NB/MCH) 601 and/or south bridge and/or input/output (I/O) controller hub (SB/ICH) 602. A processing unit 603, a main memory 604, and/or a graphics processor 605 may be connected to the NB/MCH 501. The graphics processor 605 may be connected to the NB/MCH 601 through, for example, an accelerated graphics port (AGP).

In the depicted example, a network adapter 606 connects to the SB/ICH 602. An audio adapter 607, a keyboard and/or mouse adapter 608, a modem 609, a read only memory (ROM) 610, a hard disk drive (HDD) 611, an optical drive (e.g., CD or DVD) 612, a universal serial bus (USB) ports and/or other communication ports 613, and/or PCI/PCIe devices 614 may connect to the SB/ICH 602 through a bus system 616. The PCI/PCIe devices 614 may include Ethernet adapters, add-in cards, and/or PC cards for notebook computers. The ROM 610 may be, for example, a flash basic input/output system (BIOS). The HDD 611 and the optical drive 612 may use an integrated drive electronics (IDE) and/or serial advanced technology attachment (SATA) interface. A super I/O (SIO) device 615 may be connected to the SB/ICH 602.

An operating system may run on the processing unit 603. The operating system may coordinate and/or provide control of various components within the data processing system 600. As a client, the operating system may be a commercially available operating system. An object-oriented programming system, such as the Java™ programming system, may run in conjunction with the operating system and/or provide calls to the operating system from the object-oriented programs and/or applications executing on the data processing system 600. As a server, the data processing system 600 may be an IBM® eServer™ System® running the Advanced Interactive Executive operating system or the Linux operating system. The data processing system 600 may be a symmetric multiprocessor (SMP) system that can include a plurality of processors in the processing unit 603. Alternatively, a single processor system may be employed.

Instructions for the operating system, the object-oriented programming system, and/or applications and/or programs are located on storage devices, such as the HDD 611, and/or are loaded into the main memory 604 for execution by the processing unit 603. The processes for embodiments described herein may be performed by the processing unit 603 using computer usable program code, which can be located in a memory such as, for example, main memory 604, ROM 610, and/or in one or more peripheral devices.

A bus system 616 may comprise one or more busses. The bus system 616 may be implemented using any type of communication fabric or architecture that provides for a transfer of data between different components or devices attached to the fabric or architecture. A communication unit such as the modem 609 and/or the network adapter 606 may include one or more devices that can be used to transmit and receive data.

Those of ordinary skill in the art will appreciate that the hardware depicted in FIG. 6 may vary depending on the implementation. Other internal hardware or peripheral devices, such as flash memory, equivalent non-volatile memory, or optical disk drives may be used in addition to or in place of the hardware depicted. Moreover, the data processing system 600 can take the form of any of a number of different data processing systems, including but not limited to, client computing devices, server computing devices, tablet computers, laptop computers, telephone or other communication devices, personal digital assistants, and the like. Essentially, data processing system 600 can be any known or later developed data processing system without architectural limitation.

Example Pseudocode

FIG. 7 illustrates example pseudocode for an aggregation and/or load forecasting model in accordance with an embodiment. The pseudocode describes a load aggregation and/or forecasting system that may continuously monitor multiple load sources to build a comprehensive database of available freight loads. The system may initialize with database connections, a forecasting model, and/or multiple load sources, and/or may operate in a continuous loop to crawl and/or aggregate load information. During the crawling process, the system may fetch updates from each source, parse the load data to extract relevant fields such as load ID, origin, destination, pickup and/or delivery windows, rates, and/or equipment requirements, and/or may perform upsert operations to maintain current load information in the database. The parsing function may assign timestamps for call-in dates and/or last-seen dates to track load availability over time.

The system may employ a batch processing approach to update the forecasting model, accumulating load updates until either a size threshold or time threshold is reached before triggering model updates. The forecasting model may receive formatted inputs that include both the load data and indicators of whether each load is new or updated, allowing the model to learn from the dynamic nature of load availability. This batch processing mechanism may optimize computational efficiency while helping ensure the forecasting model remains current with market conditions. The system may operate continuously with fixed intervals between crawling cycles, maintaining real-time awareness of load market changes and/or supporting predictive capabilities for future load availability patterns.

FIG. 8 illustrates example pseudocode for real time query recommendations based on contextualized loads in accordance with an embodiment. The system may produce contextualized query recommendations for external load procurement opportunities that will be accretive to a carrier's network and/or help them achieve their network objectives (e.g., profitability, reduction of empty miles, returning drivers home on time, servicing primary shippers, etc.)

The system may plan a carrier network given there exists a set of known internal loads, known external loads, a forecasting model for yet-to-be-realized internal loads, and/or a forecasting model for yet-to-be-realized external loads. To provide robust recommendations the system may use stochastic optimization techniques (e.g., lookahead models with sampled scenarios). In N scenarios, the system may sample a set of loads from the probability model formed in the forecasting model for both internal and external loads and/or blend the known real time loads with the sampled loads. The system may then put all loads into the fleet optimizer which is a simulation engine that may leverage Linear Programming (LP), Mixed-Integer Programming (MIP) optimization models, and/or other machine learning methods (e.g., approximate dynamic programming) to optimize driver assignments and tours over time (e.g. typically 3 weeks).

The system may examine which buckets of aggregated external loads attributes (e.g., aggregated lane and time attributes, equipment type, etc.) show up in the optimized solution with some minimum level of confidence. The system may produce a given number recommendations from each bucket by finding the maximum number x such that P(at least x loads with this bucket of query attributes were used by the fleet optimizer)>p where p is a chosen parameter (e.g., 0.7). For the entire state space of possibilities, this may be very sparse as most possible buckets will have no available loads, let alone moved loads. But for those spatial-temporal buckets with moved loads, some may suggest more than one load need be procured at a given time. A higher value of p may correspond to a higher certainty of a combined availability and fit in the carrier network.

FIG. 9 illustrates example pseudocode for real time querying across aggregated sources in accordance with multiple embodiments. The disclosed system may implement multiple approaches for real-time load procurement from external sources. In some aspects, an on-demand search approach may allow users to manually query external load sources through a user interface by specifying search criteria such as origin and/or destination zip prefixes, pickup time windows, minimum rates, and/or equipment types. The system may hit live APIs across multiple external sources, filter results based on user criteria, and/or score each candidate load using a combination of match quality and source confidence ratings. The loads may be ranked and presented to the user, who can then manually complete the procurement process by submitting bids through online portals or contacting the appropriate parties. This approach may provide users with immediate access to current market opportunities while maintaining manual control over the final procurement decisions.

In some cases, the system may implement automated notification and/or procurement approaches that operate based on predefined user preferences and thresholds. The system may continuously monitor external sources using polling mechanisms and/or webhooks to identify loads that meet user-specified criteria for rate thresholds, network fit confidence levels, and/or minimum match scores, automatically alerting users when suitable opportunities arise. An advanced automated completion approach may extend this functionality by automatically executing the procurement process when qualifying loads are identified, utilizing external source APIs or AI-powered communication systems to complete transactions through calls and/or emails to load contacts. These automated approaches may incorporate sophisticated pricing policies that consider factors such as profit maximization, bid acceptance probabilities, network capacity constraints, and/or the strategic value of specific opportunities within the carrier's overall network optimization goals.

FIG. 10 illustrates example pseudocode for identification of completed procurement and assignment in a carrier system in accordance with an embodiment. In some aspects, the system may include automated procurement completion tracking that identifies when external load procurement activities have been successfully completed within the carrier's transportation management system. When a new load enters the carrier's system, either through manual input or external source transmission, the system may compare the attributes of the newly acquired load against all active procurement search opportunities to determine match likelihood. The system may evaluate factors such as origin, destination, and/or pickup window alignment between the new load and existing procurement opportunities, accounting for potential variations that may result from negotiation processes. In some cases, the system may employ configurable thresholds to determine whether matches should be automatically attributed, require manual confirmation, and/or trigger notification alerts based on match probability and ambiguity levels.

The system may further incorporate automated driver assignment capabilities that leverage historical patterns and/or scenario-based predictions to recommend and/or automatically assign drivers to newly procured loads. In some embodiments, each procurement search opportunity may maintain a list of possible drivers with associated probability scores derived from previous assignments and network optimization scenarios. The system may automatically assign drivers when certainty thresholds are met, and/or may present ranked driver recommendations to users for manual selection when automatic assignment criteria are not satisfied. This functionality may streamline the complete procurement-to-assignment workflow by reducing manual intervention requirements while maintaining appropriate oversight mechanisms for complex and/or uncertain matching scenarios.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is also to be understood that the terminology used herein is for the purpose of describing particular embodiments only and is not intended to be limiting.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed:

1. A method for carrier operations, comprising:

generating, using a deep learning model on one or more processors, a real-time load model of available loads, from one or more load sources, in a n-dimensional model space, wherein the n-dimensional model space comprises an axis per category of value represented in n-tuple values and comprises spatial and temporal axes, generating, by the one or more processors, a simulated load representative of a load criteria for a carrier based on the real-time load model, wherein generating the simulated load comprises applying optimization parameters to the real-time load model to identify potential load opportunities that match the load criteria, and wherein the simulated load comprises projected load characteristics comprising at least one of origin location, destination location, load type, timing requirements, and compensation parameters;

optimizing, by the one or more processors, the simulated load through a data filter to assess risk and quality of the simulated load; and determining, by the one or more processors, a real load, based on the simulated load, from the one or more load sources by:

evaluating similarity between the projected load characteristics of the simulated load and actual load characteristics of available real loads from an updated aggregation the one or more load sources; and selecting, from the updated aggregation of the one or more load sources, one or more matching real loads from the available real loads based on a comparison to the simulated load.

2. The method of claim 1, wherein the one or more load sources comprises private customer boards, freight brokerages, public load boards, and emails.

3. The method of claim 1, further comprising aggregating, by an agent executing on the one or more processors, the one or more load sources using application programming interfaces and web scraping to determine the available loads.

4. The method of claim 3, wherein the agent is configured to continuously monitor the one or more load sources for updates to the available loads.

5. The method of claim 1, wherein the risk comprises a probability that the real load is available in the one or more load sources.

6. The method of claim 1, wherein determining the real load comprises searching an updated aggregation of the one or more load sources.

7. The method of claim 1, wherein generating the simulated load comprises generating a set of simulated loads through an optimization algorithm configured to perform at least one of improving asset network profitability by a threshold percentage and maintaining a threshold acceptance percentage of key shippers for the carrier.

8. The method of claim 1, wherein generating to the simulated load further comprises forecasting future available loads based on the real-time load model.

9. The method of claim 8, wherein forecasting comprises determining an expected time of availability for a load within a lane associated with the future available loads.

10. The method of claim 1, further comprising receiving a modification to the load criteria from the carrier.

11. The method of claim 1, further comprising requesting an assignment of the real load to the carrier.

12. The method of claim 1, wherein determining the real load based on the simulated load from the updated aggregation of the one or more load sources comprises continuously updating aggregation of the one or more load sources and detecting the one or more matching real loads based on the comparison to the simulated load.

13. A system for carrier operations, comprising:

a processor; and a non-transitory, processor-readable storage medium, wherein the non-transitory, processor-readable storage medium comprises one or more programming instructions that, when executed, cause the processor to:

generate, using a deep learning model, a real-time load model of available loads, from one or more load sources, in a n-dimensional model space, wherein the n-dimensional model space comprises an axis per category of value represented in n-tuple values and comprises spatial and temporal axes;

generate a simulated load representative of a load criteria for a carrier based on the real-time load model, wherein generating the simulated load comprises applying optimization parameters to the real-time load model to identify potential load opportunities that match the load criteria, and wherein the simulated load comprises projected load characteristics comprising at least one of origin location, destination location, load type, timing requirements, and compensation parameters;

optimize the simulated load through a data filter to assess risk and quality of the simulated load; and determine a real load, based on the simulated load, from the one or more load sources by:

evaluating similarity between the projected load characteristics of the simulated load and actual load characteristics of available real loads from an updated aggregation the one or more load sources; and selecting, from the updated aggregation of the one or more load sources, one or more matching real loads from the available real loads based on a comparison to the simulated load.

14. The system of claim 13, wherein the one or more programming instructions further cause the processor to aggregate, by an agent, the one or more load sources using application programming interfaces and web scraping to determine the available loads.

15. The system of claim 14, wherein the agent is configured to continuously monitor the one or more load sources for updates to the available loads.

16. The system of claim 13, wherein the risk comprises a probability that the real load is available in the one or more load sources.

17. The system of claim 13, wherein the one or more programming instructions that cause the processor to determine the real load further cause the processor to search an updated aggregation of the one or more load sources.

18. The system of claim 13, wherein the one or more programming instructions further cause the processor to receive a modification to the load criteria from the carrier.

19. The system of claim 13, wherein the one or more programming instructions further cause the processor to request an assignment of the real load to the carrier.

20. The system of claim 13, wherein the one or more programming instructions that cause the processor to determine the real load based on the simulated load from the updated aggregation of the one or more load sources further cause the processor to continuously update aggregation of the one or more load sources and detecting the one or more matching real loads based on the comparison to the simulated load.

* * * * *